United States Patent [19]

Woo

[11] 4,266,640
[45] May 12, 1981

[54] WHEEL CYLINDER

[75] Inventor: Ji Y. Woo, South Bend, Ind.

[73] Assignee: The Bendix Corporation, Southfield, Mich.

[21] Appl. No.: 58,973

[22] Filed: Jul. 20, 1979

[51] Int. Cl.³ .................................... B60T 8/12
[52] U.S. Cl. ................................ 188/363; 188/349; 188/181 T
[58] Field of Search ........... 188/325, 327, 342, 140 A, 188/140 R, 152, 349, 363, 364, 181 A, 181 L, 181 T; 303/112

[56] References Cited

U.S. PATENT DOCUMENTS 3,349,875 10/1967 Stelzer .................................. 188/349

*Primary Examiner*—Duane A. Reger
*Attorney, Agent, or Firm*—Paul David Schoenle; Terry L. Miller; Ken C. Decker

[57] ABSTRACT

A wheel cylinder in a brake assembly includes a housing for movably carrying a pair of pistons. An intermediate wall of the housing separates the pair of pistons from each other and cooperates with each piston to substantially form a first chamber facing one of the pistons and a second chamber facing the other piston. An inlet communicates fluid pressure to the chambers via a first path and a second path within the housing. A pressure responsive member is disposed within one of the paths and is biased to a position opening communication through the one path. When the fluid pressure within one of the chambers reaches a predetermined value, the pressure responsive member is movable to restrict fluid communication to the one chamber while the fluid pressure within the other chamber is free to increase in value during actuation of the wheel cylinder.

6 Claims, 2 Drawing Figures

WHEEL CYLINDER

BACKGROUND OF THE INVENTION

During a vehicle brake application fluid pressure is communicated to a front wheel brake assembly and a rear wheel brake assembly. As the vehicle decelerates the weight of the vehicle is shifted from the rear wheels to the front wheels so that the traction between the surface and front wheels is greater than the traction between the surface and the rear wheels. If equal fluid pressure is continuously communicated to front and rear brake assemblies, the rear wheel assembly will tend to lock up, thereby creating a dangerous skidding condition for the rear wheels.

In order to avert the above skidding condition for the rear wheel assembly it is common practice to provide a proportioning valve which is disposed within the brake fluid line. The proportioning valve is either pressure or load sensitive to restrict communication of fluid pressure to the rear brake assembly during a brake application.

Heretofore, the proportioning valve has been integrated into a master cylinder or provided as a separate assembly within the brake fluid line between the master cylinder and a wheel cylinder of the rear brake assembly. As a separate assembly the proportioning valve has required a housing and fittings for coupling the separate assembly within the brake fluid lines and as a part of the master cylinder the proportioning valve has required modifications to the master cylinder to dispose the proportioning valve within or in attachment to the master cylinder.

SUMMARY OF THE INVENTION

A brake system includes a master cylinder for generating fluid pressure during a brake application. The master cylinder is in fluid communication with a rear brake assembly including a wheel cylinder and a pair of brake shoes. Fluid pressure communicated to the wheel cylinder causes the pair of brake shoes to move from a rest position to a braking position. The wheel cylinder cooperates with a pair of pistons to substantially define separate chambers and an inlet communicates with one of the chambers via a first path and with the other chamber via a second path. A pressure responsive member is disposed within the wheel cylinder to intersect one of the paths. The pressure responsive member is movable in response to a predetermined pressure level to restrict communication of fluid pressure to one of the chambers so that the one chamber remains substantially at the predetermined pressure level while the other chamber is increasing in fluid pressure during the brake application.

In a non-servo drum brake assembly one of the brake shoes is a leading brake shoe and the one chamber receives one of the pair of pistons which opposes the leading brake shoe. Moreover, the other chamber receives the other piston for opposing the trailing brake shoe and the diameter of the other chamber and piston is larger than the diameter of the one piston and chamber so that during a brake application the force applied to the trailing shoe is greater than the force applied to the leading shoe. As the leading shoe absorbs a greater portion of braking torque than the trailing, the different diameters for the leading and trailing brake shoe pistons provides for substantially even lining wear and equal brake torque absorption for the leading and trailing brake shoes.

The pressure responsive member and a valve seat are inserted into a blind bore which intersects the one path. A spring biases the pressure responsive member toward the bottom of the blind bore to open communication from the inlet to the one path. When the fluid pressure within the one path reaches the predetermined value, the pressure responsive member moves toward the seat to close communication through the one path. A bore extending through the seat movably receives the pressure responsive member and a plug opposite the pressure responsive member retains the seat within the housing.

It is a primary object of the present invention to provide a simple valve member to limit communication of fluid pressure to a wheel cylinder which carries the valve member. Moreover, the valve member limits fluid pressure within one chamber of the wheel cylinder while another chamber is free to receive increasing fluid pressure.

DETAILED DESCRIPTION

Figures 1, 2:
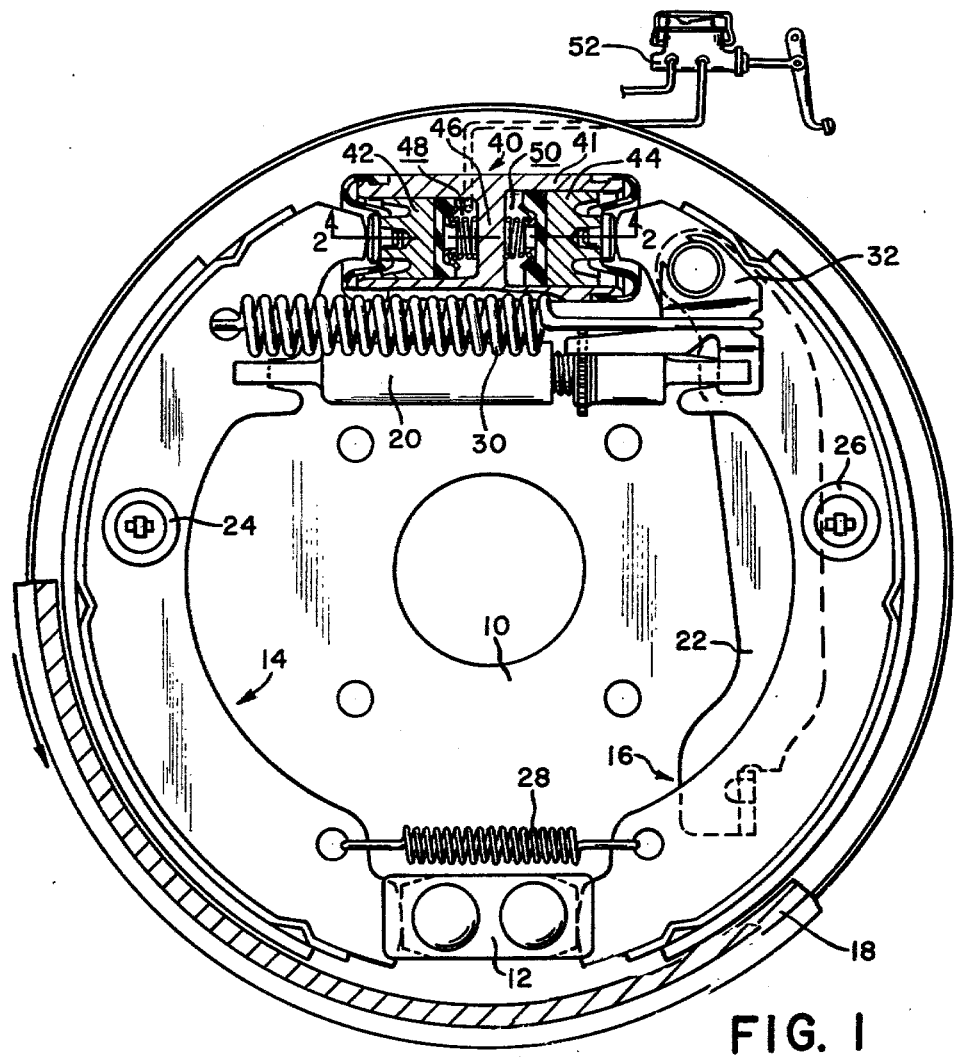
FIG. 1 is a front view of a non-servo drum brake assembly.
FIG. 2 is an enlarged cross-sectional view taken along line 2—2 of FIG. 1.

In the drum brake assembly of FIG. 1, a backing plate 10 includes an anchor 12 for pivotally anchoring a pair of brake shoes 14 and 16. With the forward direction of rotation for a drum 18 being as indicated by the arrow, the brake shoe 14 is commonly referred to as a leading brake shoe and the brake shoe 16 is commonly referred to as a trailing brake shoe. The leading brake shoe 14 absorbs a majority of the braking torque during a brake application, as the rotation of the drum 18 causes the shoe 14 to wedge or expand outwardly into engagement with the drum 18.

A strut 20 is extendible to adjust for lining wear and a parking lever 22 cooperates with the strut 20 to move the pair of brake shoes 14 and 16 to a braking position. Hold down springs 24 and 26 retain the brake shoes adjacent the backing plate and a first spring 28 adjacent the anchor 12 maintains adjoining ends of the brake shoes 14 and 16 in abutment with the anchor. A second spring 30 extends from the leading shoe 14 to a pawl 32 which is pivotally secured to the trailing shoe 16. The second spring biases the brake shoes to a rest position and imparts movement to the pawl 32.

In accordance with the invention a wheel cylinder 40 includes a housing 41 for receiving a pair of pistons 42 and 44. An intermediate wall 46 cooperates with each piston to form separate chambers 48 and 50. The diameter of piston 44 and chamber 50 is larger than the diameter of piston 42 and chamber 48. The wheel cylinder is in fluid communication with a master cylinder 52 via an inlet 54 and a pressure responsive member 56, see FIG. 2, is carried within the housing 41. The wheel cylinder housing is T-shaped with a pair of arms 58 and 60 forming the chambers 48 and 50, respectively, and a leg 62 forming the inlet 54. A first path 64 communicates the inlet with the chamber 50 and a second path 66 communicates the inlet with the chamber 48. A blind bore 68 intersects the second path 66 and movably receives the pressure responsive member 56. A seat 70 is sealingly disposed within the blind bore. A bore 72 extending through the seat 70 sealingly receives a portion of member 56 for movement therein and an enlarged head 74 on the member 56 opposes the end of seat 70 to form an opening permitting fluid communication from inlet 54 to chamber 48 via path 66. A spring 76 normally biases the member 56 to engage the head 74 with the bottom wall of blind bore 68. A side aperture 78 on the seat provides for fluid communication from the spacing defined by a reduced diameter portion 80 of member 56 and seat 70 to the chamber 48. To prevent removal of the seat 70 and pressure responsive member 56 from the blind bore 68, a snap ring 82 is disposed within a recess 84 to oppose the seat 70. In a similar manner a snap ring 86 is disposed within a recess 88 to oppose the pressure responsive member and act as a spring rest for spring 76.

MODE OF OPERATION

During a brake application pressurized fluid is communicated from the master cylinder 52 to the wheel cylinder 40. With the pressure responsive member 56 biased to the rest position illustrated, fluid pressure is communicated from the inlet port 54 to the chamber 50 via path 64 and to the chamber 48 via path 66. The pressurized fluid within each chamber acts against the respective pistons 44 and 42 to move the latter away from the intermediate wall 46. As the diameter of piston 44 is larger than piston 42, the force acting on piston 44 and brake shoe 16 is greater than on piston 42 and brake shoe 14. However, the direction of rotation for the drum 18 causes the brake shoe 14 to pivot into tight engagement with the drum 18. Consequently, brake shoes 14 and 16 should absorb substantially equal braking torque so that brake shoe 14 will wear to the same dimension as brake shoe 16.

As the pressure level within the wheel cylinder 40 continues to increase above a predetermined value during the brake application, the pressure responsive member starts to move against the spring 76 to position the head 74 against the end of seat 70. The head 74 abuts the seat to seal the chamber 48 from the inlet 54 so that further increases in fluid pressure, above the predetermined value, will be communicated to only chamber 50. As a result the braking torque absorbed by the leading brake shoe 14 will remain substantially the same when the fluid pressure communicated to the wheel cylinder is above the predetermined value. Only the trailing brake shoe 16 experiences an increase in braking torque as the fluid pressure within the wheel cylinder is increased above the predetermined value. Consequently, the rotation of drum 18 is retarded during braking; however, by limiting the amount of fluid pressure communicated to the chamber 48, the drum is substantially prevented from locking up to avoid a dangerous skidding condition.

I claim:

1. In a wheel cylinder having a housing forming a pair of chambers separated from each other by a common wall, a pair of pistons movably disposed within respective chambers and opposing respective brake shoes, said housing including passage means for communicating fluid pressure to said pair of chambers, characterized by pressure responsive valve means disposed within said housing passage means, said pressure responsive valve means being movable in response to fluid pressure within said passage means to close a portion of said passage means so as to substantially maintain one of said chambers at a predetermined pressure level while said other chamber is increasing in fluid above said predetermined pressure level during actuation of said wheel cylinder.

2. The wheel cylinder of claim 1 in which said one chamber carries a piston which opposes a leading brake shoe in a drum brake assembly.

3. A wheel cylinder comprising:
a housing defining a pair of separate bores therein;
a pair of pressure-responsive pistons slidably received respectively in said pair of bores, said housing and said pistons cooperating to substantially define a pair of pressure chambers;
said housing defining an inlet and a pair of passage means communicating respectively with said pair of pressure chambers for communicating pressurized fluid from said inlet to said pair of pressure chambers;
pressure-responsive valve means movably disposed in one of said passage means for closing communication of pressurized fluid to one of said pressure chambers responsive to a predetermined fluid pressure in said one passage means, said valve means limiting the maximum fluid pressure in said one pressure chamber to said predetermined fluid pressure.

4. The invention of claim 3 wherein said housing defines a third bore defining a part of said one passage means, said pressure-responsive valve member being received in said third bore and defining a valve seat disposed toward said inlet with respect to fluid flow through said one passage means, said pressure responsive valve means including a valve member movably cooperating with said valve seat to open and close fluid communication through said one passage means, resilient means for biasing said valve member to a position opening fluid communication through said one passage means, said valve member including an enlarged portion cooperating with the remainder of said valve member to define a differential area which is exposed to the pressurized fluid in said one passage means between said valve seat and said inlet, said differential area creating a force opposing said resilient means and moving said valve member to a second position in engagement with said valve seat and closing fluid communication through said one passage means responsive to said predetermined pressure of said pressurized fluid in said one passage means.

5. The invention of claim 3 or 4 wherein said one chamber carries a piston engaging a leading brake shoe in a drum brake assembly with respect to brake drum rotation in a forward direction.

6. The invention of claim 3 or 4 wherein said one chamber defines a diameter which is less than the diameter of the other chamber.

* * * * *